United States Patent
Ferri et al.

(10) Patent No.: US 7,252,399 B2
(45) Date of Patent: Aug. 7, 2007

(54) FOLDING CONVERGING LIGHT INTO A LIGHTPIPE

(75) Inventors: John Ferri, Oak Park, CA (US); Michael Newell, Thousand Oaks, CA (US); Clark Pentico, Simi Valley, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 186 days.

(21) Appl. No.: 10/917,054

(22) Filed: Aug. 12, 2004

(65) Prior Publication Data

US 2005/0036203 A1 Feb. 17, 2005

Related U.S. Application Data

(60) Provisional application No. 60/495,241, filed on Aug. 14, 2003.

(51) Int. Cl.
*F21V 9/14* (2006.01)
(52) U.S. Cl. .................. 362/19; 362/551; 362/583
(58) Field of Classification Search .............. 362/19, 362/339, 551, 554, 556, 558, 582, 583; 385/36; 359/833, 837; 353/81
See application file for complete search history.

(56) References Cited

U.S. PATENT DOCUMENTS

| 3,626,170 | A | * | 12/1971 | Schwan | 362/554 |
| 3,807,842 | A | * | 4/1974 | Baker | 359/834 |
| 7,033,056 | B2 | * | 4/2006 | Andersen et al. | 362/554 |
| 2006/0044833 | A1 | * | 3/2006 | Li | 362/616 |

* cited by examiner

*Primary Examiner*—Y. My Quach-Lee
(74) *Attorney, Agent, or Firm*—Allen, Dyer, Doppelt, Milbrath & Gilchrist, P.A.

(57) ABSTRACT

The present invention relates to a folded front end unit used in a light engine of a projection display device. The front end unit comprises a light source for generating a beam of light, and a lightpipe for providing spatial uniformity to the beam of light. Polarization-dependent front end units include polarization beam splitters for separating the light into orthogonally polarized sub-beams, and a polarization rotating element, e.g. a waveplate, for rotating the polarization of one of the sub-beams. In accordance with the present invention, a prism is positioned between the light source and the lightpipe for reflecting the light into the lightpipe. The difference in refractive index between the air and the prism decreases the cone angle of the beam of light enough to effectively increase the distance between the light source and the lightpipe to compensate for the added distance required to fold the light.

14 Claims, 6 Drawing Sheets

FOLDING CONVERGING LIGHT INTO A LIGHTPIPE

CROSS-REFERENCE TO RELATED APPLICATIONS

The present invention claims priority from U.S. Patent Application No. 60/495,241 filed Aug. 14, 2003, which is incorporated herein by reference.

TECHNICAL FIELD

The present invention relates to folding converging light into a lightpipe, and in particular to a compact light engine for a projection display device, including a prism for folding converging light from a light source into a lightpipe.

BACKGROUND OF THE INVENTION

Conventional light engines for projection display devices, such as projectors and projection televisions, include a powerful light source for generating light, relay optics for transmitting the light, an image engine for converting the light into primary colors and selecting the appropriate color for each pixel, and projection optics for projecting the light onto a screen.

A Digital Light Processing (DLP®) system is illustrated in FIG. 1, and includes a light source 1 for focusing light 2 into a lightpipe 3, which ensures that the light 2 generated by the light source 1 is spatially uniform before entering the remainder of the system. Typically, the lightpipe 3 is comprised of a hollow pipe with a highly reflective inner surface or a solid piece of optically transparent material, e.g. a glass rod. The non-uniform light 2 enters the lightpipe 3 from the light source 1 and is reflected off of the walls thereof via total internal reflection (TIR). The light 2 mixes together as it propagates down the light pipe 3 forming a highly uniform source of light 4. The light source 1 and the lightpipe 3 are referred to as a polarization independent front-end unit. A color wheel 6 rotates to alternatively provide the three primary colors, i.e. blue, red and green, which are then focused onto a Digital Micromirror Device (DMD®) chip 7, via relay lens 8 and a TIR prism 9. The DMD chip 7 reflects the desired color combinations through a projection lens 10 onto a screen (not shown).

A Liquid Crystal on Silicon (LCOS) system is illustrated in FIG. 2, and includes a polarization dependent front end unit comprising a light source 11 for focusing light 12 into a polarization controlling lightpipe (PCLP) 13. The PCLP 13 not only ensures that the light is spatially uniform, but it also ensures that all of the input light has the same state of polarization, which is a requirement of the LCOS system. The light 12 enters a first polarization beam splitting (PBS) cube 14, which transmits p-polarized light directly to the PCLP 13, while reflecting s-polarized to a second PBS 16, which reflects the light through a polarization rotator 17, e.g. a ½-wave retarder. The polarization of the reflected s-polarized light is rotated by 90° to become p-polarized light, which then enters into the PCLP 13. Uniform light 18 exiting the PCLP 13 focused onto an LCOS image kernel 19 via a relay lens 20. The LCOS image kernel 19 includes dichroic filters for separating the light into primary colors, i.e. red, green and blue, and three LCOS panels (one for each primary color) for reflecting the desired combination of colors through a projection lens 21 onto a screen (not shown).

As light engine systems become less expensive and smaller, design requirements often demand that the optical path be folded before or after entering the lightpipe. Typically, several factors combine to create the folded path requirement, e.g. smaller packaging, light engine space envelope requirements, the specific light engine design, the orientation of the light engine or the operational requirements of the light source.

Unfortunately, light collection optics operate at a low focal ratio, e.g. approximately F/1, which causes the cone of light exiting the light source to converge rapidly as it approaches' the entrance to the lightpipe, thereby leaving little or no room to fold the light without causing a vignetting effect, resulting in a loss of luminous flux.

In conventional light engine systems the folding of light is conducted by flat mirrors positioned in the optical path. However, these folds are not typically positioned at the input or output ends of the lightpipe, because the high flux levels of the light at those points could crack or melt the flat mirrors or cause damage to the reflective coating thereon.

One attempt to solve the aforementioned problem includes inserting an elliptical reflector and a lens system for relaying the light from the light source to the lightpipe input. In this case a fold mirror could be positioned where the flux is not concentrated. However, this solution has increased costs, requires more space, and results in a decrease in lumens due to the addition of the lens system.

An object of the present invention is to overcome the shortcomings of the prior art by providing an efficient way to fold the converging light in a light engine between the light source and the lightpipe without lenses or flat mirrors.

SUMMARY OF THE INVENTION

Accordingly, the present invention relates to a front end unit for a light engine system comprising:

a light source defined by a focal number for producing a high-flux converging beam of light along a first axis in free space and having a first cone angle;

a lightpipe for inputting the converging beam of light and for outputting a relatively more spatially uniform beam of light along a second axis; and a prism for folding the converging beam of light from the light source into the lightpipe;

wherein the converging beam of light passing through the prism has a second cone angle less than the first cone angle, effectively increasing the focal ratio of the light source, which effectively provides extra distance between the light source and the lightpipe.

BRIEF DESCRIPTION OF THE DRAWINGS

The invention will be described in greater detail with reference to the accompanying drawings which represent preferred embodiments thereof, wherein.

DETAILED DESCRIPTION

Figure 3:
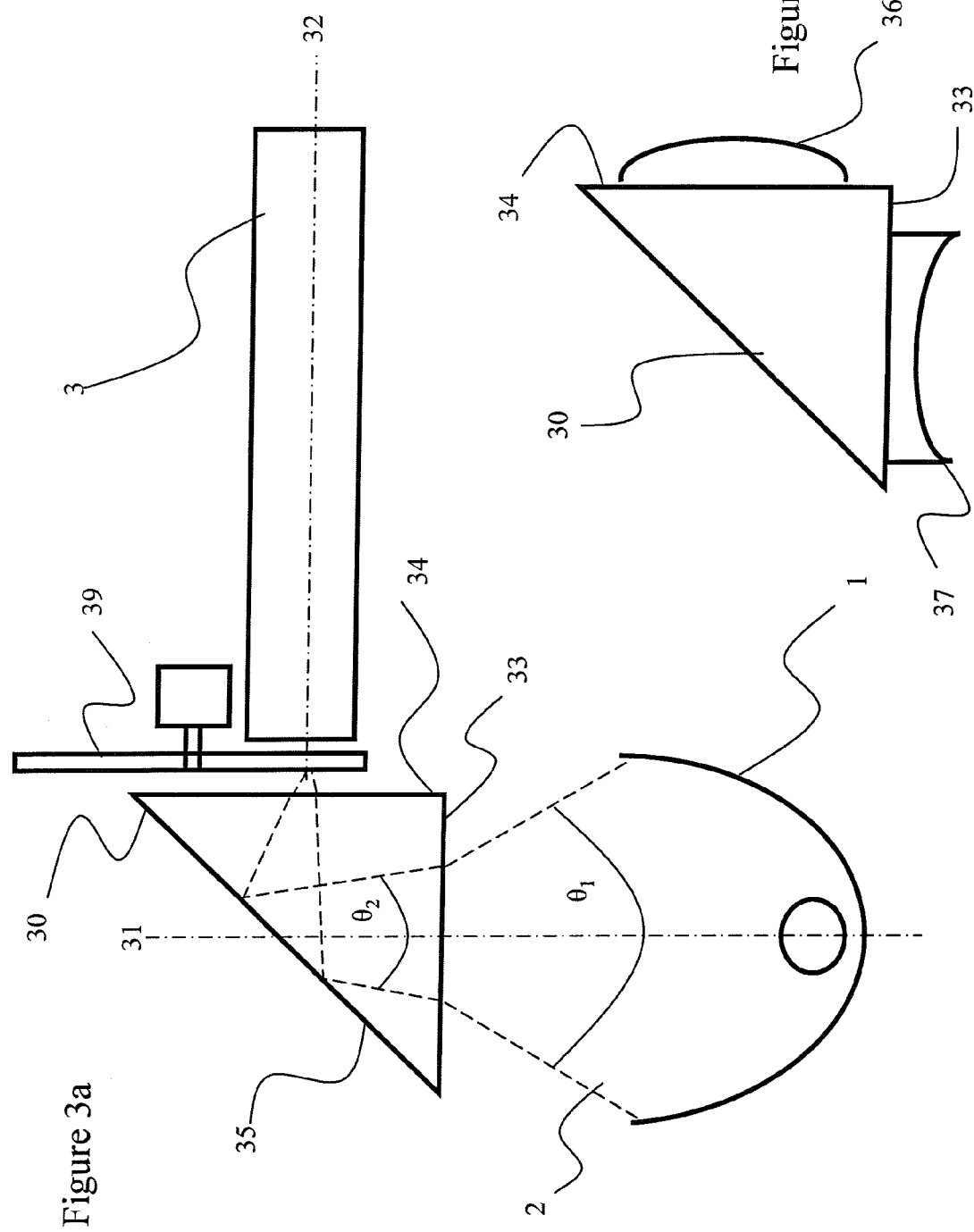
FIG. 3a is a folded front end of a light engine system according to the present invention.
FIG. 3b illustrates the prism of FIG. 3a with additional lenses.

With reference to FIG. 3a, a polarization independent front end unit according to the present invention includes the light source 1 for generating the rapidly-converging high-flux beam of light 2, and the lightpipe 3 for ensuring that the beam of light is spatially uniform. Standard light sources 1 produce 1000 to 3000 lumens, while large venue projection systems produce up to 10,000 to 15,000 lumens. A prism, preferably a right angle glass prism 30, is positioned between the light source 1 and the lightpipe 3, so that the optical axis 31 of the light source 1 can be rotated relative to the longitudinal axis 32 of the lightpipe 3, e.g. by 90°. An input face 33 of the prism 30 is perpendicular to the optical axis 31 of the light source 1, while an output face 34 is perpendicular to the longitudinal axis 32 of the lightpipe 3. A third face 35 of the prism 30, e.g. the hypotenuse, with a reflective coating is positioned at an angle so that the incoming light 2 is reflected by the mirrored face 35, and is directed into the lightpipe 3. The angle of the third face 34 relative to the incoming light is dependent upon the relative position of the longitudinal axis 32 of the lightpipe 3 and of the refractive index of the prism 30, i.e. the difference between the refractive index of the air and the refractive index of the prism 30. Preferably a small air gap is provided between the prism 30 and the lightpipe 3, but the prism can be attached directly to the light pipe 3, as in FIG. 4

The light source 1 has a relatively low focal ratio (F/#≈F/0.8 to F1.1), i.e. focal length/iris diameter, whereby the beam of light 2 is rapidly converging in free space and enters the prism 30 through the front face 33 with a relatively wide first cone angle $\theta_1$, which ranges from 24° to 78°. Due to the difference in the refractive indices at the interface of the air ($n_{air}$=1.0) and the prism. 30 ($n_{glass}$=1.5), the cone angle decreases to $\theta 2$, which ranges from 15.9° to 49.2°, in accordance with Snell's law. The decrease in cone angle effectively increases the F/# of the light source, thereby effectively providing the extra distance required to fold the light. As in FIG. 3b, a focusing lens, in the form of a concave lens 36, a convex lens 37 or a GRIN lens (not shown) can also be provided between the prism 30 and the lightpipe 3 and/or between the light source 1 and the prism 30 to simplify and/or improve the relay lens section and to improve the image quality, if necessary. Preferably, the lenses are attached directly to the prism to facilitate assembly. A right angled prism 30 is the preferred embodiment; however, other shapes of prisms are possible, with acute or obtuse angles between the input and output faces, depending upon the angle between the axis 31 of the light source 1 and the axis 32 of the lightpipe 3

Accordingly, the use of the prism 30 with an index of refraction greater than air ensures that the beam of light 2 is reflected providing the extra distance required between the light source 1 and the lightpipe 3 to do so. A color wheel 39 can be provided between the prism 30 and the lightpipe 3 to alternatively provide the three primary colors, i.e. blue, green and red, through a projection lens onto a screen.

Figure 4:
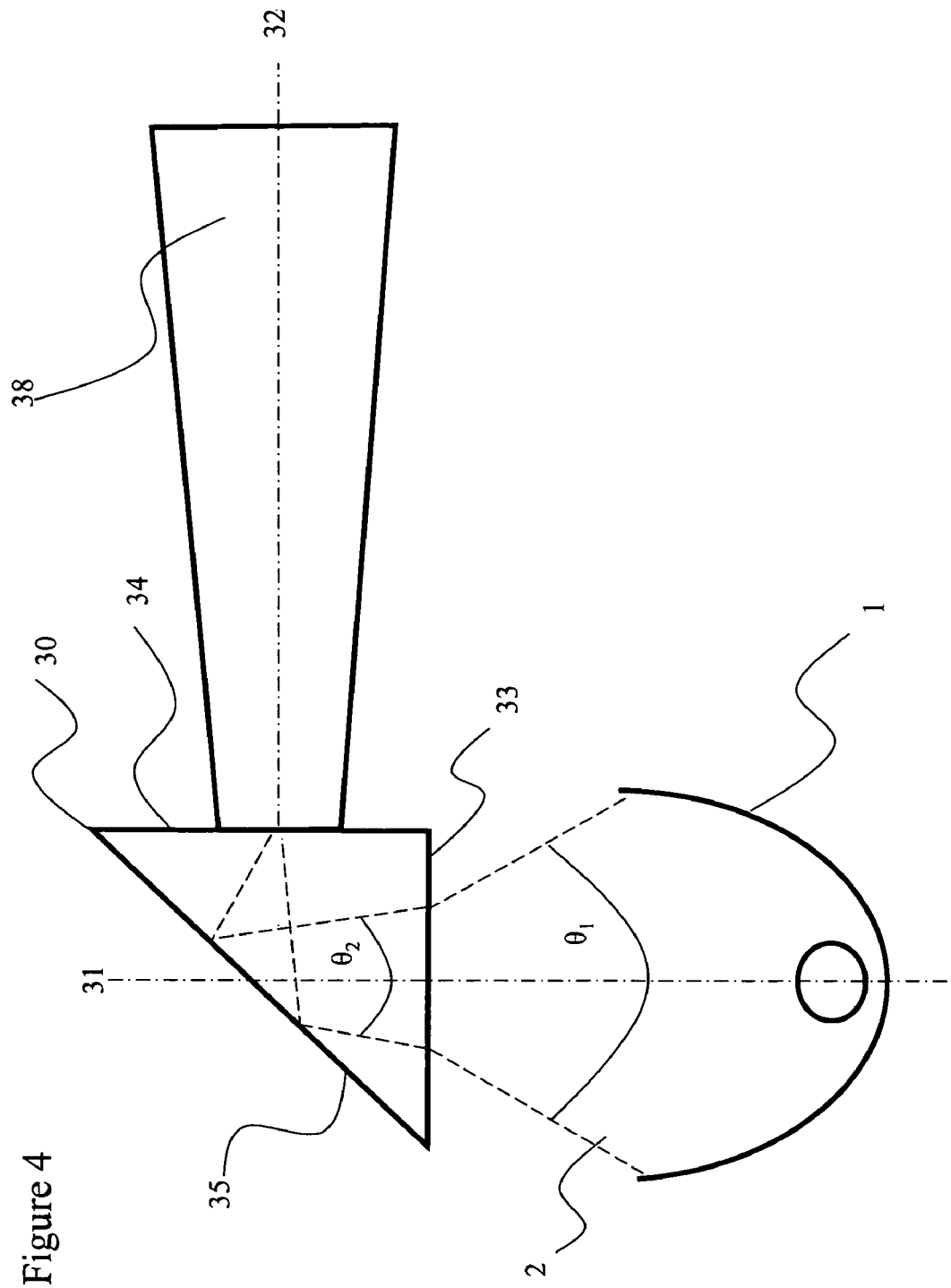
FIG. 4 is an alternative embodiment of a folded front end of a light engine system according to the present invention

FIG. 4 illustrates a second embodiment of the present invention in which total internal reflection is used to reflect the beam of light 2 off of the third face 35 instead of a coating. A tapered lightpipe 38 replaces the original lightpipe 3 to ensure that the TIR condition is not defeated. Accordingly, the use of the prism 30 with an index of refraction greater than air ensures that the beam of light 2 is reflected providing the extra distance required between the light source 1 and the lightpipe 3 to do so, and without the use of flat mirrors or coatings.

Figure 1:
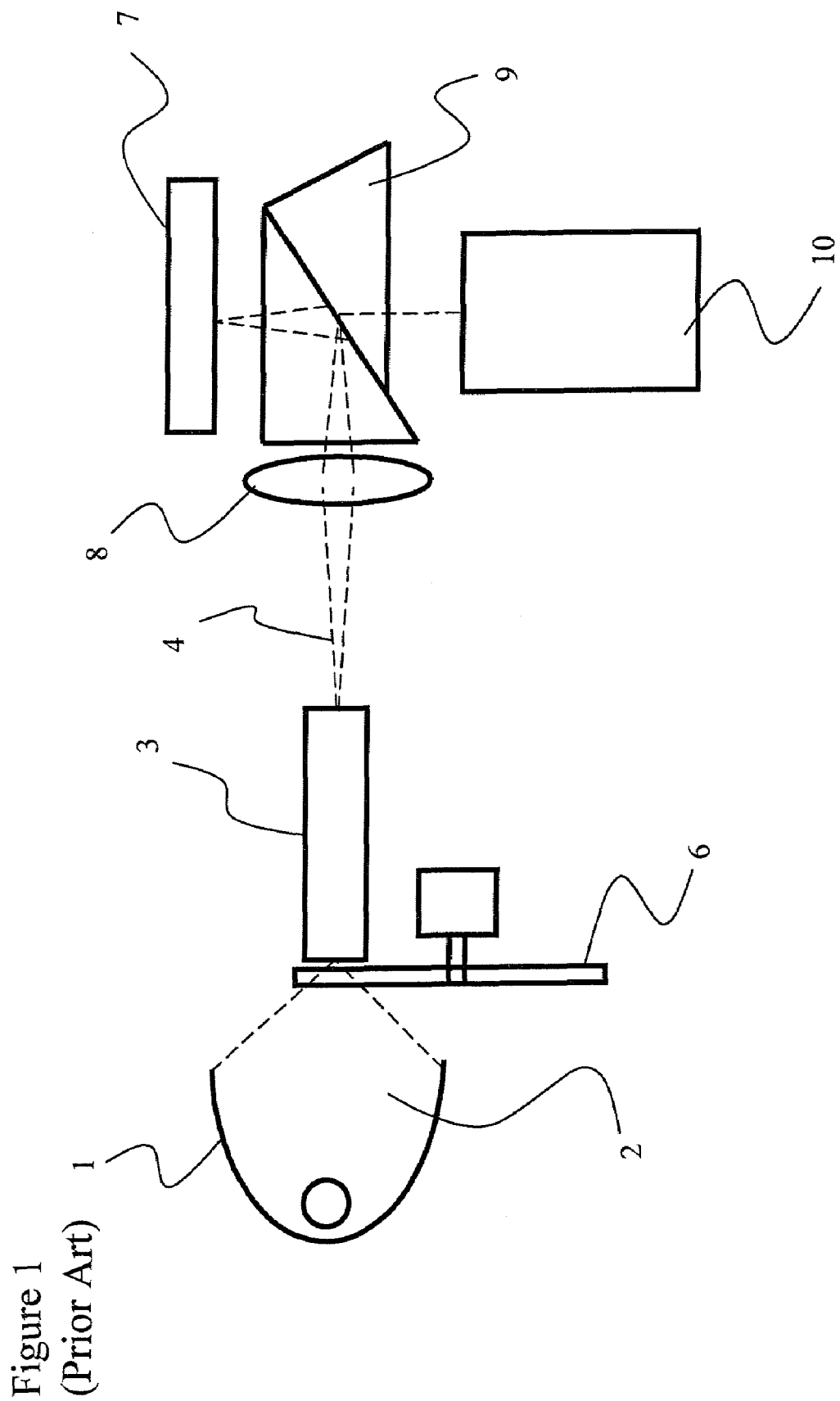
FIG. 1 is a schematic representation of a conventional DLP light engine system.
Figure 2:
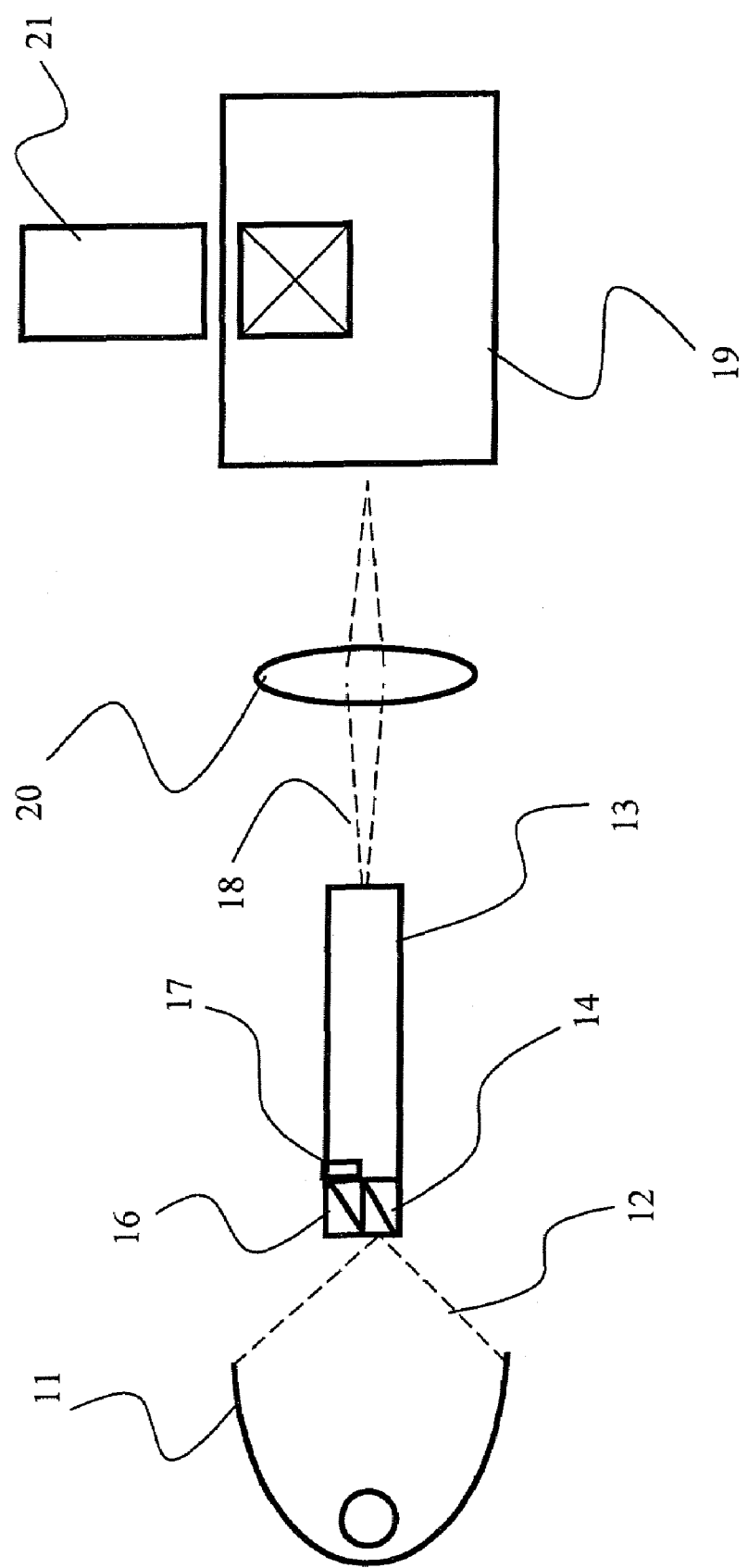
FIG. 2 is a schematic representation of a conventional LCOS light engine system.
Figure 5:
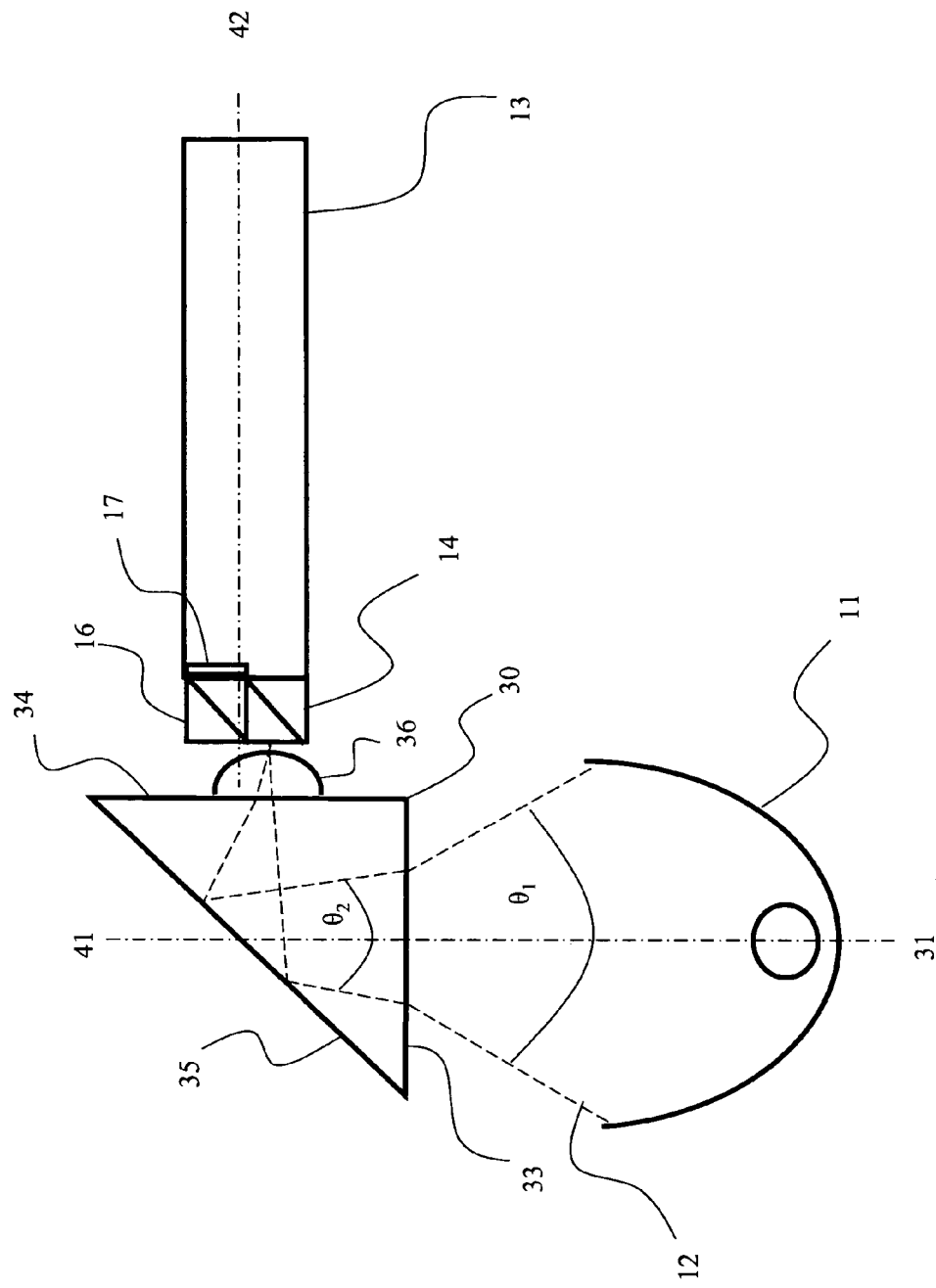
FIG. 5 is polarization-dependent folded front end of a light engine system according to the present invention.

FIG. 5 illustrates a third embodiment of the present invention comprising a polarization-dependent front end unit for use in a polarization dependent light engine system, such as the one illustrated in FIG. 2. As in FIG. 2, the light source 11, with optical axis 41, produces a high-flux, rapidly-converging beam of light 12 for input the lightpipe 13, which is defined by longitudinal axis 42. The first polarization beam splitter 14 passes the light of a first polarization, e.g. p-polarization, while reflecting light of a second polarization, e.g. s-polarization. The second beam splitter 16 reflects the s-polarized light again through the polarization rotator 17 in the direction of the lightpipe 3. In this arrangement, the prism 30 (as in FIG. 3) is used to reflect the light from the lights source 11 to the first polarization beam splitter 14.

Figure 6:
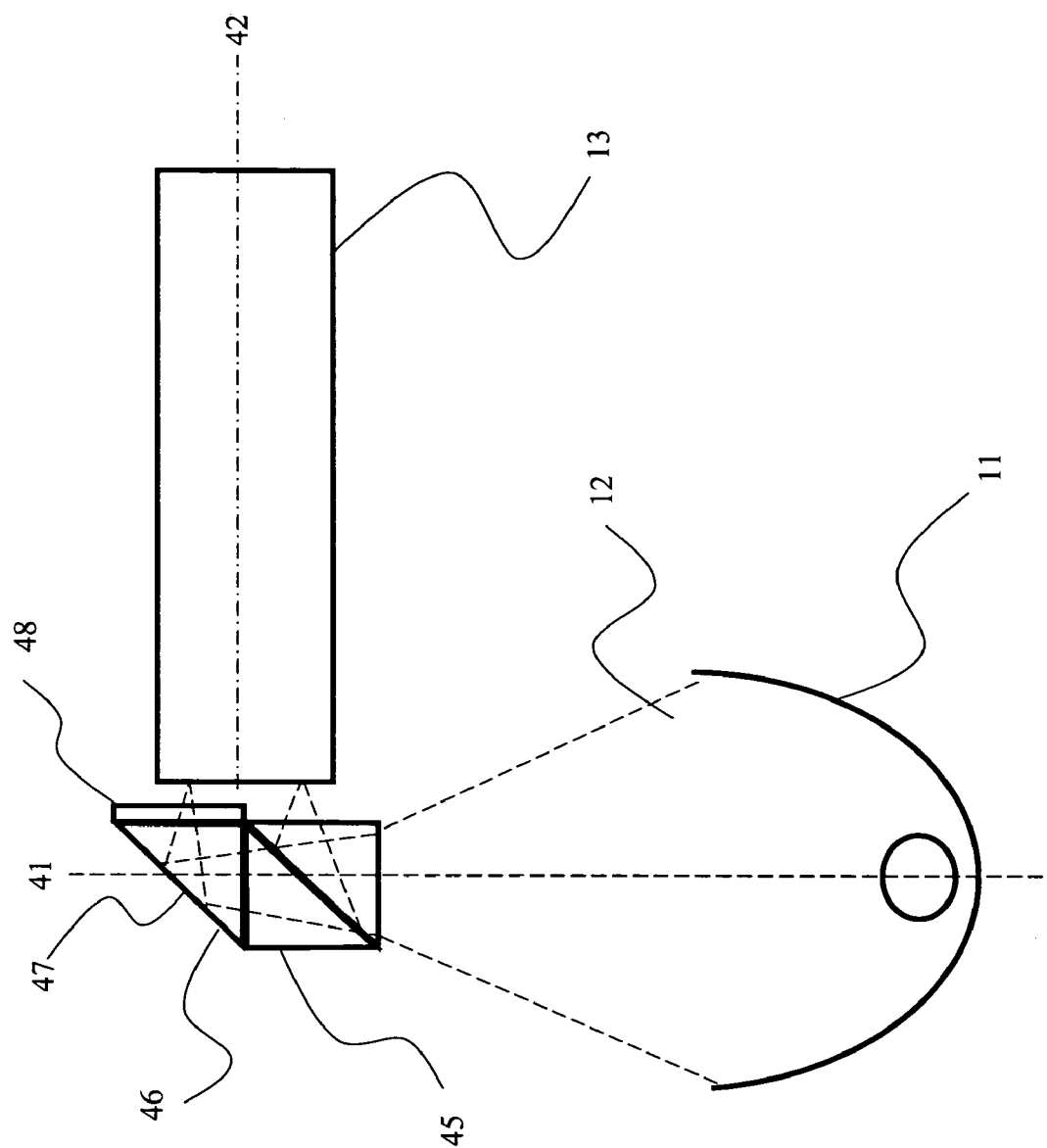
FIG. 6 is an alternative embodiment of a polarization-dependent folded front end unit of a light engine system according to the present invention.

A fourth embodiment of the present invention, illustrated in FIG. 6, provides a polarization-dependent front end unit in which the light source 11 produces a high-flux, rapidly-converging, beam of light 12 for input the lightpipe 13. Instead of positioning the prism 30 between the light source 11 and the first polarization beam splitter 14, a first polarization beam splitter 45 is positioned in the path of the beam of light 12 for reflecting the light of a first polarization, e.g. s-polarization, while passing the light of the orthogonal polarization, e.g. p-polarization, to a prism 46. The light of the second polarization is reflected off of the air/prism interface 47 by total internal reflection through a polarization rotator 48 into the lightpipe 13. In this arrangement, the second PBS 16 can be eliminated, and replaced by the prism 46. The air/prism interface 47 may or may not have a polarization-dependent coating to enhance reflection.

We claim:

1. A front end unit for a light engine system comprising:
   a light source defined by a focal ratio for producing a high-flux converging beam of light along a first axis in free space and having a first cone angle;
   a lightpipe for inputting the converging beam of light and for outputting a relatively more spatially uniform beam of light along a second axis;
   a prism for folding the converging beam of light from the light source into the lightpipe;
   a polarization beam splitter between the light source and the prism for reflecting light of a first polarization into the lightpipe and for passing light of a second polarization to the prism; and
   a polarization rotator for rotating the polarization of the light with the second polarization to the first polarization before entering the lightpipe;
   wherein the prism has a larger index of refraction than the free space, whereby the converging beam of light passing from the free space through the prism has a second cone angle less than the first cone angle, effectively increasing the focal ratio of the light source, and
   wherein the second cone angle effectively provides extra distance between the light source and the lightpipe to enable the beam of light to be folded into the lightpipe.

2. The front end unit according to claim 1, wherein the prism is a right angle prism having a first face substantially perpendicular to the first axis, and a second face substantially perpendicular to the second axis and the first face.

3. The front end unit according to claim 1, wherein the first cone angle is between 24° and 78°.

4. The front end unit according to claim 3, wherein the second cone angle is between 15.9° and 49.2°.

5. The front end unit according to claim 1, wherein the prism reflects the beam of light by total internal reflection.

6. The front end unit according to claim 5, wherein the lightpipe comprises a tapered lightpipe.

7. The front end unit according to claim 6, wherein all sides of the prism are polished to provide light beam homogenization.

8. The front end unit according to claim 1, wherein the lightpipe comprises a lightpipe selected from the group consisting of a hollow pipe with a reflective inner surface, and a solid optically transparent material.

9. The front end unit according to claim 1, wherein the focal ratio of the light source is approximately F/0.8 to F/1.1.

10. The front end unit according to claim 1, wherein the converging beam of light is between 1,000 and 15,000 lumens.

11. A front end unit for a light engine system comprising:
   a light source defined by a focal ratio for producing a high-flux converging beam of light along a first axis in free space and having a first cone angle;
   a lightpipe for inputting the converging beam of light and for outputting a relatively more spatially uniform beam of light along a second axis;
   a prism for folding the converging beam of light from the light source into the lightpipe; and
   a lens between the prism and the lightpipe for focusing the converging light into the lightpipe;
   wherein the prism a larger index of refraction than the free space, whereby the converging beam of light passing from the free space through the prism has a second cone angle less than the first cone angle, effectively increasing the focal ratio of the light source, and
   wherein the second cone angle effectively provides extra distance between the light source and the lightpipe to enable the beam of light to be folded into the lightpipe.

12. The front end unit according to claim 11, further comprising:
   a first polarization beam splitter between the prism and the lightpipe for passing light of a first polarization directly to the lightpipe and for reflecting light of a second polarization;
   a second polarization beam splitter for reflecting the light of the second polarization towards the lightpipe; and
   a polarization rotator for rotating the polarization of the reflected light with the second polarization to the first polarization before entering the lightpipe.

13. The front end unit according to claim 11, wherein the lens is attached to the prism.

14. A front end unit for a light engine system comprising:
   a light source defined by a focal ratio for producing a high-flux converging beam of light along a first axis in free space and having a first cone angle;
   a lightpipe for inputting the converging beam of light and for outputting a relatively more spatially uniform beam of light along a second axis;
   a prism for folding the converging beam of light from the light source into the lightpipe; and
   a color wheel between the prism and the lightpipe;
   wherein the prism a larger index of refraction than the free space, whereby the converging beam of light passing from the free space through the prism has a second cone angle less than the first cone angle, effectively increasing the focal ratio of the light source, and
   wherein the second cone angle effectively provides extra distance between the light source and the lightpipe to enable the beam of light to be folded into the lightpipe.

* * * * *